United States Patent
Hammad et al.

(10) Patent No.: US 10,056,635 B2
(45) Date of Patent: Aug. 21, 2018

(54) ENHANCED ELECTROCHEMICAL OXIDATION OF CARBONACEOUS DEPOSITS IN LIQUID-HYDROCARBON FUELED SOLID OXIDE FUEL CELLS

(71) Applicant: Saudi Arabian Oil Company, Dhahran (SA)

(72) Inventors: Ahmad D. Hammad, Dhahran (SA); Stamatios Souentie, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 340 days.

(21) Appl. No.: 14/623,884

(22) Filed: Feb. 17, 2015

(65) Prior Publication Data
US 2016/0240878 A1    Aug. 18, 2016

(51) Int. Cl.
*H01M 8/06*    (2016.01)
*H01M 8/12*    (2016.01)
(Continued)

(52) U.S. Cl.
CPC ....... *H01M 8/0681* (2013.01); *H01M 8/0656* (2013.01); *H01M 8/0662* (2013.01);
(Continued)

(58) Field of Classification Search
CPC . H01M 8/0681; H01M 8/1246; H01M 8/1233
See application file for complete search history.

(56) References Cited

U.S. PATENT DOCUMENTS

2002/0014417 A1* 2/2002 Kuehnle .............. C25B 3/02
                                                        205/437
2002/0098400 A1* 7/2002 Mieney ............. H01M 8/04089
                                                        429/415
(Continued)

FOREIGN PATENT DOCUMENTS

EP          2160783 B1    8/2013
WO      2004062006 A1    7/2004
(Continued)

OTHER PUBLICATIONS

Y. Hirata et al., Development of electrochemical cell with layered composite of the Gd-doped ceria/electronic conductor system for generation of H2—CO fuel through oxidation-reduction of CH4—CO2 mixed gases, Ceramics International, vol. 35, Dec. 3, 2008, pp. 2023-2028.*

(Continued)

*Primary Examiner* — Osei K Amponsah
(74) *Attorney, Agent, or Firm* — Dinsmore & Shohl LLP

(57) ABSTRACT

Embodiments of a method of removing carbonaceous deposits in a liquid-hydrocarbon fueled solid oxide fuel cell and related system are provided. The method includes providing a solid oxide fuel cell system having an anode, a cathode, a solid oxide electrolyte oriented between the anode and cathode, an amplifier cathode disposed proximate the solid oxide electrolyte and the cathode, a fuel cell electric circuit electrically connecting the anode and the cathode, and an amplifier electric circuit electrically connecting the anode and the amplifier cathode. Further, operating the amplifier (Continued)

electric circuit in an electrolytic mode to electrically power the amplifier cathode, wherein the amplifier cathode generates and supplies $O^{2-}$ or $CO_3^{2-}$ to the anode. The method further includes removing the carbonaceous deposits on the anode by converting the carbonaceous deposits to carbon dioxide gas via reaction with the $O^{2-}$ or $CO_3^{2-}$ and expelling the carbon dioxide gas.

19 Claims, 2 Drawing Sheets

(51) Int. Cl.

| | | |
|---|---|---|
| *H01M 8/0662* | (2016.01) | |
| *H01M 8/1246* | (2016.01) | |
| *H01M 8/1233* | (2016.01) | |
| *H01M 8/0656* | (2016.01) | |
| *H01M 8/0668* | (2016.01) | |
| *H01M 8/124* | (2016.01) | |

(52) U.S. Cl.
CPC .......... *H01M 8/0668* (2013.01); *H01M 8/12* (2013.01); *H01M 8/1233* (2013.01); *H01M 8/1246* (2013.01); *H01M 2008/1293* (2013.01); *H01M 2300/0071* (2013.01)

(56) References Cited

U.S. PATENT DOCUMENTS

| | | |
|---|---|---|
| 2003/0022032 A1 | 1/2003 | Miller et al. |
| 2005/0271931 A1 | 12/2005 | Finnerty |
| 2008/0092830 A1* | 4/2008 | Suzuki ............. H01M 8/04022 123/3 |

FOREIGN PATENT DOCUMENTS

| | | | | |
|---|---|---|---|---|
| WO | 2005008820 A1 | 1/2005 | | |
| WO | WO 2005/008820 A1 * | 1/2005 | ............. | H01M 8/04 |

OTHER PUBLICATIONS

Balomenou et al., "Triode Fuel Cells", Solid State Ionics, vol. 177, pp. 2023-2027, 2006.
Sapountzi et al., "Enhanced performance of CO poisoned proton exchange membrane fuel cells via triode operation", Electrochimica Acta, vol. 56, pp. 6966-6975, 2011.
Tsampas et al., "Triode operation of CO poisoned PEM fuel cells: Fixed and cyclic potential tirode operation", Solid State Ionics, vol. 225, pp. 272-276, 2012.
International Search Report and Written Opinion dated Mar. 23, 2016 pertaining to International application No. PCT/US2016/013394.
Chalakov, L. et al., Reaction induced current generation by butane oxidation in high temperature electrochemical membrane reactor, Chemical Engineering Journal, May 15, 2007, pp. 15-22, vol. 131, Elsevier B.V.
Hirata, Y. et al., Development of electrochemical cell with layered composite of the Gd-doped ceria/electronic conductor system for generation of H2—CO fuel through oxidation-reduction of CH4CO2 mixed gases, Ceramics International, Dec. 3, 2008, pp. 2023-2028, vol. 35, Elsevier Ltd and Techna Group S.r.l.

* cited by examiner

ENHANCED ELECTROCHEMICAL OXIDATION OF CARBONACEOUS DEPOSITS IN LIQUID-HYDROCARBON FUELED SOLID OXIDE FUEL CELLS

BACKGROUND

Field

Embodiments of the present disclosure generally relate to solid oxide fuel cells (SOFCs) and, more specifically relate to a method of removing carbonaceous deposits in a liquid-hydrocarbon fueled solid oxide fuel cell and associated specially configured liquid-hydrocarbon fueled solid oxide fuel cell system.

Technical Background

As is conventionally known, a solid oxide fuel cell consists of three major parts; an anode, where electrochemical oxidation takes place, a cathode, where electrochemical reduction takes place and the electrolyte membrane, which is a dense, gas impermeable, ion transport membrane which exhibits purely ionic or mixed ionic-electronic conductivity at an elevated temperature range. Cathodes produce oxygen ions which then migrate through the electrolyte membranes to the anode electrode. The oxygen ions oxidize the fuel in the anode and thereby produce electrons, which flow through an external electrical circuit back to the cathode, thereby generating electrical energy.

Referring to FIG. 1, conventional solid oxide fuel cells 100 (SOFC), include an anode 120. The anode 120 is in contact with the solid oxide electrolyte 170 and may also be exposed to fuel (gas, liquid or solid), for example, a carbonaceous fuel 142. In the cathode 130, which performs $O_2$ (g) reduction of the cathode metal in the presence of air 144 to yield oxygen ions 146, is placed on the opposing side of the solid oxide electrolyte 170. For current collection at the anode 120, a metal wire, or any other electron conducting material that is solid and inert at the operating conditions, may be electrically connected to the anode 120 to facilitate collection of the electrons which travel back to the cathode 130 via electrical circuit 150.

Referring again to FIG. 1, an electrochemical reaction converts fuel 142 and air 144 into electricity without combustion. A solid oxide fuel cell 100 is a high temperature fuel cell. At high temperature, warmed air 144 enters the solid oxide fuel cell 100 adjacent the cathode 130 and carbonaceous fuel 142 enters the solid oxide fuel cell 100 adjacent to the anode 120. Subsequently, a chemical reaction begins in the solid oxide fuel cell 100. As the fuel 142 crosses the anode 120, it attracts oxygen ions 146 from the cathode 130. The oxygen ions 146 combine with the fuel 142 to produce electricity and waste products 148 including water, and small amounts of carbon dioxide. As long as there is fuel 142, air 144, and heat, the process continues producing electricity. However, as the solid oxide fuel cell 100 operates the efficiency and/or power output diminishes over time.

Accordingly, ongoing needs exist for methods of improving the long-term efficiency and power output of solid oxide fuel cells 100 and for solid oxide fuel cell systems which maintain efficiency and power output over time.

SUMMARY

The method and systems of the present disclosure have industrial applicability, specifically in the Oil & Gas and Power industries due to the rapidly increasing worldwide energy consumption and the decreased efficiency of fuel cells over time as a result of carbonaceous deposits 140 on the anode 120. Carbonaceous deposits 140 can build up on the anode 120 which reduces the operating efficiency of the solid oxide fuel cell 100.

According to one embodiment, a method of removing carbonaceous deposits in a liquid-hydrocarbon fueled solid oxide fuel cell is provided. The method includes providing a solid oxide fuel cell system having an anode, a cathode, a solid oxide electrolyte oriented between the anode and cathode, an amplifier cathode disposed proximate the solid oxide electrolyte and the cathode, a fuel cell electric circuit electrically connecting the anode and the cathode, and an amplifier electric circuit electrically connecting the anode and the amplifier cathode. The method further includes operating the amplifier electric circuit in an electrolytic mode to electrically power the amplifier cathode. Operating the amplifier electric circuit in an electrolytic mode results in the amplifier cathode generating and supplying $O^{2-}$ or $CO_3^{2-}$ to the anode. Further, the method includes removing the carbonaceous deposits on the anode by converting the carbonaceous deposits to carbon dioxide gas via reaction with the $O^{2-}$ or $CO_3^{2-}$ and expelling the carbon dioxide gas.

In a further embodiment, a method of removing carbonaceous deposits in a liquid-hydrocarbon fueled solid oxide fuel cell is provided. The method includes providing a solid oxide fuel cell system having an anode, a cathode, a solid oxide electrolyte oriented between the anode and cathode, an amplifier cathode disposed proximate the solid oxide electrolyte and the cathode, a fuel cell electric circuit electrically connecting the anode and the cathode, and an amplifier electric circuit comprising at least one battery, potentiostat, or galvanostat electrically connecting the anode and the amplifier cathode. Further, the method includes monitoring a power reaction speed of the solid oxide fuel cell system. The method additionally includes operating the amplifier electric circuit in an electrolytic mode to electrically power the amplifier cathode, wherein the amplifier cathode generates and supplies $O^{2-}$ or $CO_3^{2-}$ to the anode. Further, the method includes removing the carbonaceous deposits on the anode by converting the carbonaceous deposits to carbon dioxide gas via reaction with the $O^{2-}$ or $CO_3^{2-}$ and expelling the carbon dioxide gas. Finally the method includes adjusting the current supplied to the amplifier electric circuit to obtain steady-state operation of the removal of the carbonaceous deposits on the anode.

In yet a further embodiment, a solid oxide fuel cell system is provided. The solid oxide fuel cell system includes an anode, a cathode, a solid oxide electrolyte oriented between the anode and cathode, and an amplifier cathode disposed proximate the solid oxide electrolyte and the cathode. The solid oxide fuel cell system additionally has a fuel cell electric circuit electrically connecting the anode and the cathode and an amplifier electric circuit having at least one battery, potentiostat, or galvanostat electrically connecting the anode and the amplifier cathode. Additionally, the solid oxide fuel cell system has a liquid fuel atomizer located to distribute the liquid-hydrocarbon fuel across the anode. The amplifier electric circuit operates in an electrolytic mode to electrically power the amplifier cathode which generates and supplies $O^{2-}$ or $CO_3^{2-}$ to the anode to remove carbonaceous deposits on the anode by converting the carbonaceous deposits to carbon dioxide gas via reaction with the $O^{2-}$ or $CO_3^{2-}$ to produce carbon dioxide gas.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of the method of removing carbonaceous deposits in a liquid-hydrocarbon fueled solid oxide fuel cell and related system of the present disclosure. Though the schematics and system of FIGS. 2 and 3 are provided as exemplary, it should be understood that the present systems and methods encompass other configurations.

Figure 1:
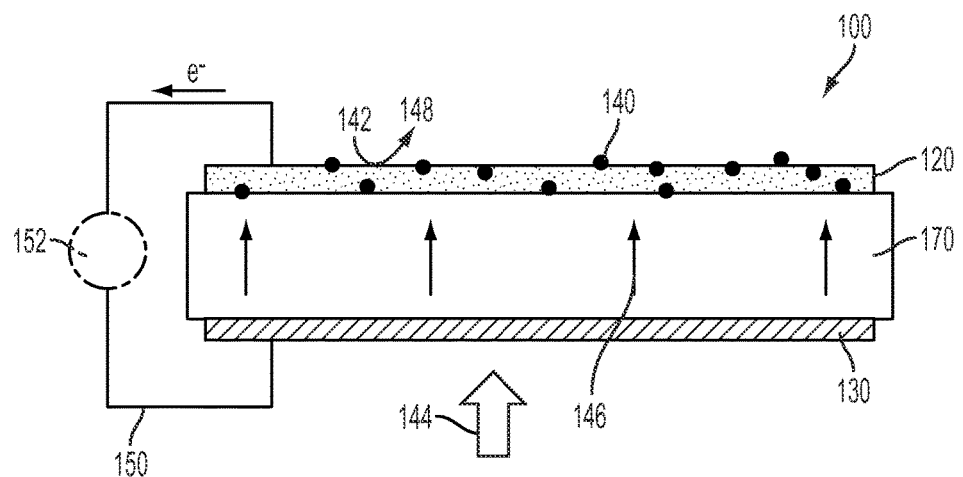
FIG. 1 is a schematic illustration of a conventional SOFC.
Figure 2:
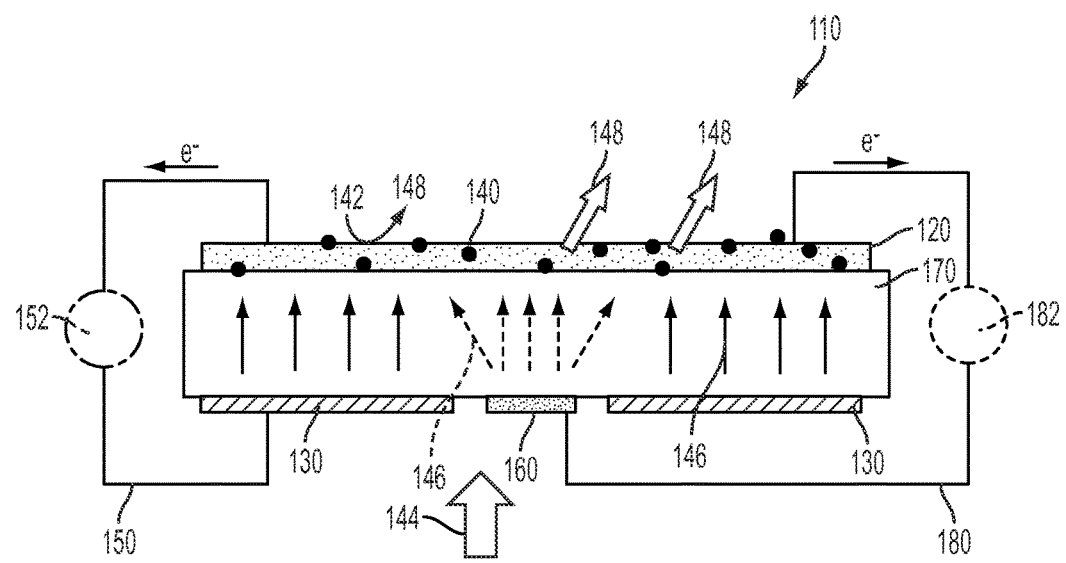
FIG. 2 is a schematic illustration of a SOFC with an amplifier electrical circuit in accordance with one or more embodiments of the present disclosure.
Figure 3:
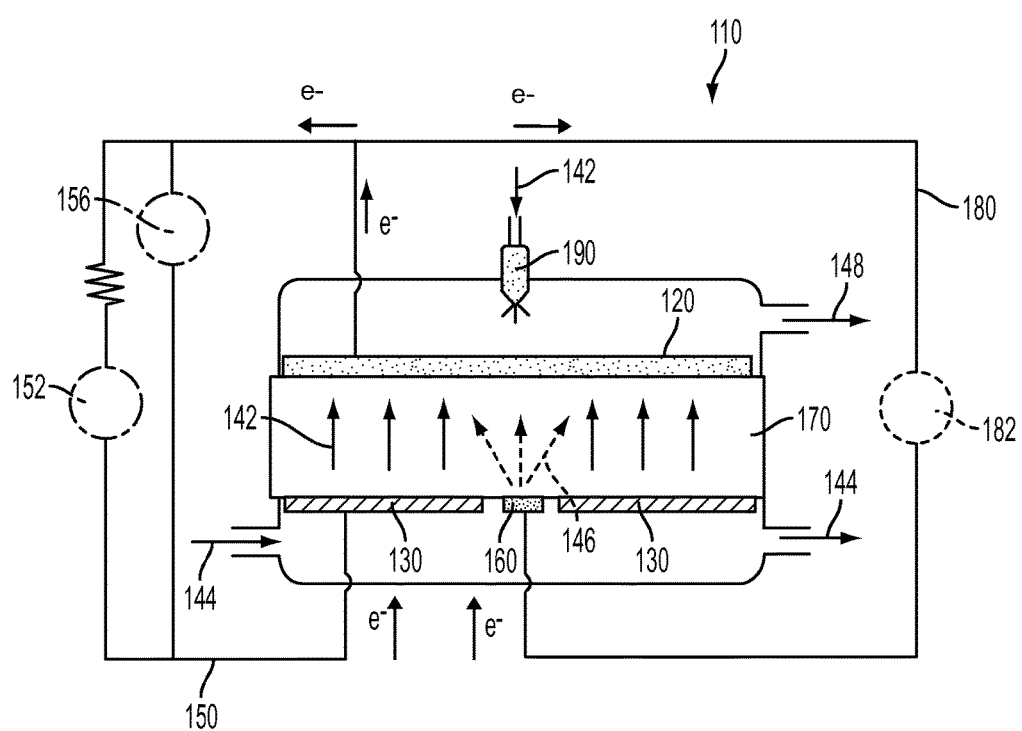
FIG. 3 depicts a SOFC system with an amplifier electrical circuit and a liquid fuel atomizer in accordance with one or more embodiments of the present disclosure.

Referring to the embodiment of FIG. 2, a solid oxide fuel cell (SOFC) system 110 is shown. The solid oxide fuel cell system 110 comprises an anode 120, a cathode 130, a solid oxide electrolyte 170 oriented between the anode 120 and cathode 130. Additionally, the solid oxide fuel cell system 110 comprises an amplifier cathode 160 disposed proximate the solid oxide electrolyte 170 and the cathode 130. A fuel cell electric circuit 150 electrically connects the anode 120 and the cathode 130. The solid oxide fuel cell system 110 also comprises an amplifier electric circuit 180 electrically connecting the anode 120 and the amplifier cathode 160. As used herein, "between" does not necessarily mean directly contacting, and contemplates that additional components are suitable between the anode 120, cathode 130, or electrolyte 170 of the solid oxide fuel cell system 110.

As shown in FIG. 2, the solid oxide fuel cell system 110 comprises one or more external electric circuits, for example the fuel cell electric circuit 150, which collect electrons from the anode 120 to generate electricity. In various embodiments, the fuel cell electric circuit 150 may comprise a wire, or any other electron conducting material that is solid and inert at the operating conditions, to facilitate collection of the electrons which travel back to the cathode 130 via the fuel cell electric circuit 150.

In operation as shown in FIG. 2, the cathode 130 reduces the $O_2$ in the inlet air stream 144 in accordance with the following reaction (R1) to generate oxygen ions 146:

$$O_2(g) + 4e^- \rightarrow 2O^{2-} \qquad (R1)$$

After the oxygen ions 146 migrate through the solid oxide electrolyte 170, the oxygen ions 146 arrive at the anode 120 and oxidize the fuel 142 to produce carbon dioxide and water in addition to electrons, which are used to generate electricity. This electrochemical oxidation reaction (R2) is shown below:

$$C_xH_y + (2x+y/2)O^{2-} \rightarrow xCO_2(g) + (y/2)H_2O + (4x+y)e^- \qquad (R2)$$

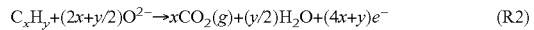

In operation, the solid oxide fuel cell system 110, as well as the conventional solid oxide fuel cell 100, does not operate perfectly in accordance with R2. Oxygen ions 146 are driven from the cathode 130 to the anode 120 through the solid oxide electrolyte 170, to oxidize the fuel 142 and produce electricity. The driving force for oxygen ions 146 is a spontaneous migration as a result of the oxygen chemical potential difference between the anode 120 and cathode 130. However, due to homogenous gas phase pyrolysis and/or cracking reactions that take place at high temperatures, carbonaceous deposits 140 are formed on the surface of the anode 120, thereby blocking the normal operation of the anode 120 and thus deteriorate the performance of the solid oxide fuel cell 110. Thus, carbonaceous deposits 140 build up on the anode 120 which reduces the operational efficiency of the solid oxide fuel cell system 110. The efficiency of the solid oxide fuel cell system 110 is the useful power generated as a percentage of the total power anticipated. The efficiency of the solid oxide fuel cell system 110 can be expressed by the formula: $\varepsilon = P_{gen}/\Delta G_{fuel}$, where $\varepsilon$ is the fuel cell efficiency, $P_{gen}$ is the useful power output and $\Delta G_{fuel}$ the Gibbs free energy of the fuel oxidation reaction. Specifically, the accumulation of carbonaceous deposits 140 on the anode 120 occurs in accordance with the electrochemical reaction (R3) shown below.

$$C_xH_y \rightarrow C_xH_n^* + ((y-n)/2)H_2 \qquad (R3)$$

The accumulation of the carbonaceous deposits 140 on the anode 120 is remedied by providing additional ionic oxygen 146 to the anode 120. When the oxygen ions 146 reach the surface of the anode 120 they selectively react with the carbonaceous deposits 140 at the proximity of the triple phase boundaries (tpb) to form $CO_2$ (g). The reaction of the carbonaceous deposits 140 and oxygen ions 146 to form $CO_2$ results in removal of the carbonaceous deposits 140. The reaction (R4) to remove the carbonaceous deposits 140 is provided below.

$$C_xH_n^* + (3x+n/2)O^{2-} \rightarrow xCO_2(g) + (n/2)H_2 + (4x+n)e^- \qquad (R4)$$

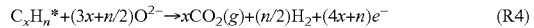

As shown in FIGS. 2 and 3, the solid oxide fuel cell system 110 comprises one or more external electric circuits in addition to the fuel cell electric circuit 150, for example the amplifier electric circuit 180, which operate in an electrolytic mode. Operation in an electrolytic mode means the circuit is provided power to complete electrolysis or supply power to drive an oxidation-reduction reaction in a direction in which it does not occur spontaneously. Specifically, the amplifier electric circuit 180 consumes electric energy in order to generate oxygen ions 146 at the cathode 130 for passage to the surface of the anode 120. In various embodiments, the amplifier electric circuit 180 may comprise a wire, or any other electron conducting material that is solid and inert at the operating conditions, to facilitate transmission of electrons to the cathode 130 via the amplifier electric circuit 180.

Operating the amplifier electric circuit 180 in an electrolytic mode electrically powers the amplifier cathode 160. The electric powering of the amplifier cathode 160 generates and supplies $O^{2-}$ to the anode 120. The supplied $O^{2-}$ as ionic oxygen 146 passing through the solid oxide electrolyte 170 removes the carbonaceous deposits 140 on the anode 120 by converting the carbonaceous deposits 140 to carbon dioxide gas 148 via reaction with the ionic oxygen 146. The generated carbon dioxide gas 148 is then expelled from the solid oxide fuel cell 110. The carbon dioxide gas 148 is expelled from the solid oxide fuel cell 110 in accordance with any method known to one having skill in the art. For example, as shown in FIG. 3, piping may be utilized to direct the carbon dioxide gas 148 away from the solid oxide fuel cell 110. In embodiments there is no need for any additional equipment to remove the produced carbon dioxide gas 148 as the pressure drop due to the carbon dioxide gas 148 flux along the pipeline is a sufficient driving force for carbon dioxide gas 148 removal.

The amplifier electric circuit 180 of the solid oxide fuel cell 110 comprises at least one power source 182 that powers the amplifier electric circuit 180. In one embodiment, the power source 182 is at least one battery. Non-limiting examples of batteries include lithium batteries, alkaline batteries, silver-oxide batteries, zinc-carbon batteries, lead-acid batteries, lithium-ion batteries, nickel hydrogen batteries, and sodium-ion batteries. The batteries may be primary cells (non-rechargeable batteries) or secondary cells (rechargeable batteries) in various embodiments. In further embodiments, the at least one battery may be recharged by diverting a portion of the electricity produced by the solid oxide fuel cell system 110 to the battery. One having skill in the art would understand that additional specific batteries or alternative power sources are known and appreciate that they may equally be utilized as the power source 182.

In further embodiments, the power source 182 that powers the amplifier electric circuit 180 is a fuel cell electric circuit 150. For example, the amplifier electric circuit 180 may include at least one potentiostat which controls the power supplied to the amplifier cathode 160 from the at least one fuel cell electric circuit 150. Specifically, the potentiostat functions by maintaining the potential of the at least one fuel cell electric circuit 150 at a constant level by adjusting the current supplied to the amplifier electric circuit 180. In a further example, the amplifier electric circuit 180 may include at least one galvanostat which controls the power supplied to the amplifier cathode 160 from the at least one fuel cell electric circuit 150. The potentiostat and/or galvanostat work as power supplies to provide electron current to the amplifier cathode 160. If a constant potential between the anode 120 and the amplifier cathode 160 is desired then the potentiostat can be used, while when a constant current between the anode 120 and the amplifier cathode 160 is preferred the galvanostat can be used. Therefore, when a constant ionic oxygen 146 supply rate is required, the galvanostat is preferable.

In various embodiments, the current supplied to the amplifier electric circuit 180 is substantially constant. In further embodiments, the current supplied to the amplifier electric circuit 180 is pulsed. Whether the current supplied to the amplifier electric circuit 180 constant or pulsed, the minimum applied potential is the $O_2$ reduction potential or the corresponding current. The $O_2$ reduction potential typically ranges from approximately 0.1V to approximately 0.5V. Specific $O_2$ reduction potentials for various solid oxide fuel cell systems 110 with differing anode 120, cathode 130, and/or solid oxide electrolyte 170 are known to one having ordinary skill in the art. The maximum applied potential is the limited to the electrolyte reduction potential or the corresponding current. The electrolyte reduction potential typically ranges from approximately 2V to approximately 3V. Specific electrolyte reduction potentials for various solid oxide fuel cell systems 110 with differing anode 120, cathode 130, and/or solid oxide electrolyte 170 are known to one having ordinary skill in the art.

Referring to FIGS. 2 and 3, in further embodiments, the solid oxide fuel cell system 110 further comprises a voltmeter unit 156 and an ammeter unit 152 that measure the voltage and the current respectively in the fuel cell electric circuit 150. From the measurements of the voltmeter unit 156 and the ammeter unit 152, the power output can be simply and directly calculated.

In further embodiments, the solid oxide fuel cell system 110 further comprises a control circuit to pulse the current supplied to the amplifier electric circuit 180 as the solid oxide fuel cell's 110 power output drops below a certain percentage of the initial non-carbon poisoned power output, The decrease in fuel cell power output before initiation of the control circuit to pulse the current supplied to the amplifier electrode circuit may be approximately 20%, approximately 30%, approximately 40%, approximately 50%, approximately 60%, approximately 70%, approximately 80%, or approximately 90% in various embodiments. Additionally, in various embodiments, the potentiostat and/or galvanostat used to apply potential or current to the amplifier circuit, may have an integrated voltmeter and ammeter to measure the voltage and current. Thus, power supplied may be simply and directly calculated.

In various embodiments, the power reaction speed of the solid oxide fuel cell system 110 is monitored. The power reaction speed may be monitored by observing the current supplied by the fuel cell electric circuit 150 or the voltage provided by the fuel cell electric circuit 150 for example.

In various embodiments, the current supplied to the amplifier electric circuit 180 is adjusted to obtain steady-state operation of the removal of the carbonaceous deposits 140 on the anode 120. Steady-state operation of the removal of the carbonaceous deposits 140 means the carbonaceous deposits 140 are removed at a rate equal to the rate that the carbonaceous deposits 140 form. If the carbonaceous deposits 140 are forming at a rate in excess of the rate at which the carbonaceous deposits 140 are removed, the power reaction speed of the solid oxide fuel cell system 110 decreases and the current supplied to the amplifier electric circuit 180 is increased to increase the rate of removal of the carbonaceous deposits 140. The current supplied to the amplifier electric circuit 180 may be decreased to decrease the rate of removal of the carbonaceous deposits 140 until the rate of formation of the carbonaceous deposits 140 once again exceeds the rate of removal of the carbonaceous deposits 140. Minimizing the current supplied to the amplifier electric circuit 180 while still removing the carbonaceous deposits 140 at a rate equal to the rate of formation of the carbonaceous deposits 140 maximizes the efficiency of the solid oxide fuel cell system 110 by avoiding unnecessary ionic oxygen 146 formation.

In various embodiments, the anode 120 is contemplated as comprising any of various metals suitable for oxidation, for example, a metallic, metal oxide, or ceramic-metallic. For example, and not by way of limitation, the anode 120 comprises metal selected from the group consisting of iron (Fe), copper (Cu), nickel (Ni), cobalt (Co), gold (Au), ruthenium (Ru), rhodium (Rh), tungsten (W), chromium (Cr), terbium (Tb), magnesium (Mg), platinum (Pt), palladium (Pd), and combinations thereof.

For the case of the solid oxide electrolyte 170, high ionic conductivity and negligible chemical interactions with the anode 120 are required. That being said, various compositions are suitable for the solid oxide electrolyte 170, with the major requirement being oxygen ion conductivity. Suitable solid oxide electrolytes 170 may be either purely ionic or mixed ionic-electronic.

For example, and not by way of limitation, the solid oxide electrolyte 170 may comprise zirconia based electrolytes or ceria based electrolytes. In specific embodiments, the zirconia-based electrolyte may be selected from the group consisting of yttria stabilized $ZrO_2$ (YSZ), scandia stabilized $ZrO_2$ (ScSZ), calcia stabilized $ZrO_2$ (CSZ), samaria stabilized $ZrO_2$ (SmSZ), and combinations thereof. In an exemplary embodiment, the solid oxide electrolyte 170 comprises yttria stabilized $ZrO_2$ (YSZ). Alternatively, the ceria-based electrolytes may comprise rare earth doped ceria. For example, the ceria-based electrolytes are selected from the group consisting of gadolinium doped ceria (GDC), yttria doped ceria (YDC), samarium doped ceria (SmDC), scandium doped ceria (ScDC), zirconium doped ceria (ZDC), gadolinia stabilized ceria (CGO) and combinations thereof. Further examples of the solid oxide electrolyte 170 include titania-based, perovskite oxides, or cationic carbonate-based electrolytes.

When selecting the composition for the solid oxide electrolyte 170, the following factors should be considered: 1. any possible chemical interactions with any of the electrodes, which may have a catastrophic effect on the solid oxide fuel cell 110; 2. the fuel cell operating temperature range; and 3. the ionic/electronic conductivity ratio value. As a result, combinations of two or more solid oxide electrolytes 170 may be used to ensure these factors are met. For example, in cases where a non-stable solid oxide electrolyte 170 (which interacts with the anode 120) is necessary to be used in the solid oxide fuel cell 110 due to its remarkable ionic conductivity at the desired operating temperature, a thin coating of a chemically stable solid electrolyte may be used at the electrolyte/anode interface to avoid direct contact between the anode 120 and the solid oxide electrolyte 170. The same technique can be used to block the electronic conductivity that a highly conductive mixed ionic-electronic solid electrolyte may exhibit at the desired temperature range. In that instance, a thin coating of a purely ionic conductor (e.g. YSZ) may be beneficial.

Regarding the cathode 130 and amplifier cathode 160, any cathodic material that exhibits low $O_2$ (g) reduction overpotential at the operating temperature range while having negligible interactions with the solid oxide electrolyte 170 could be used in the cathode 130 and the amplifier cathode 160. For example and not by way of limitation, the cathode 130 or the amplifier cathode 160 may comprise of perovskite materials of the general type $ABO_3$ or $ABMO_3$ or $A_{1-x}Sr_xFe_{1-y}Co_yO_{3-\delta}$ or $A_{1-x}B_xM_{1-y}Mg_yO_{3-\delta}$, where A may be one of the group La, Sn, Nd, Gd, Ba or Dy; B may be one of the $2^+$, $3^+$, $4^+$ or $5^+$ cations, and M may be a transition metal. Two preferred perovskite cathodes are $LaSrFeCoO_{3-\delta}$ (LSCF) and $LaSrMnO_{3-\delta}$ (LSM). A further exemplary perovskite cathode is $Sr_2MgMo_{0.8}Nb_{0.2}O_{6-\delta}$. Additionally, transition metal electrodes may be used as the cathode 130 or the amplifier cathode 160. Non-limiting examples include Pt, Ir and Au.

In another embodiment, the cathode 130 and the amplifier cathode 160 are the same compositions. As the function of the cathode 130 and the amplifier cathode 160 is the same in that $O_2$ reduction occurs in both the cathode 130 and the amplifier cathode 160, the same material can be used providing the advantage of lower overall manufacturing cost.

In further embodiments, the cathode 130 and the amplifier cathode 160 are different compositions. Utilizing different compositions for the cathode 130 and the amplifier cathode 160 allows high performing cathode materials which are typically more expensive to be used as the amplifier cathode 160 due to the relatively smaller size of the amplifier cathode 160 compared to the cathode 130. Utilizing a high performing cathode material for the amplifier cathode 160 results in higher oxygen reduction rates than with a lower cost and lower performing cathode material which may compensate for the smaller size of the amplifier cathode 160.

Referring to FIG. 3, in embodiments, the solid oxide fuel cell system 110 further comprises a liquid fuel atomizer 190. The liquid fuel atomizer 190 is placed spaced away from the top of the anode 120. Utilizing the liquid fuel atomizer 190 allows distribution of the fuel 142 across the anode 120. Distribution of the fuel 142 across the anode 120 results in increased fuel utilization. Additionally, distribution of the fuel 142 across the anode 120 results in highly dispersed carbonaceous deposits 140. The ionic oxygen 146 generated at the amplifier cathode 160 dispersed across the anode 120 as it passes through the solid oxide electrolyte 170 and thus highly dispersed carbonaceous deposits 140 are preferred to effectively utilize all the generated ionic oxygen 146.

While not shown, several conventional (e.g. utilizing the wasted heat from a furnace), non-conventional (i.e. renewable: solar photovoltaic (PV) or concentrated solar power (CSP), wind power, etc.), or combined heating methods can be used to achieve the required high operating temperature range of the solid oxide fuel cell 110.

In further embodiments, the fuel cell is a molten-carbonate fuel cell (MCFC). When the fuel cell is a molten-carbonate fuel cell the ionic species transferred through the solid oxide electrolyte 170 is ionic carbonate ($CO_3^{2-}$). Additionally, equations R1, R2, and R4 are replaced with R5, R6, and R7 reproduced below.

$$2CO_2(g)+O_2(g)+4e^-\rightarrow 2CO_3^{2-} \quad (R5)$$

$$C_xH_y+(2x+y/2)CO_3^{2-}\rightarrow(3x+y/2)CO_2(g)+(y/2)H_2O+(4x+y)e^- \quad (R6)$$

$$C_xH_n^*+(3x+n/2)CO_3^{2-}\rightarrow(3x+n/2)CO_2(g)+(n/2)H_2O+(4x+n)e^- \quad (R7)$$

Liquid hydrocarbon-powered fuel cells can exhibit operation efficiency values up to 90% but the operation of direct-feed of the hydrocarbon fuel 142 at the anode 120, where high efficiency values can be achieved, is still challenging and difficult to be applied due to the traditional issues with carbonaceous deposits 140 forming on the anode 120. However, by removing carbonaceous deposits 140 from the anode 120 the operating efficiency of the solid oxide fuel cell system 110 is maintained. In another embodiment, the efficiency of the solid oxide fuel cell system 110 exceeds 40% and is maintained in excess of 40% indefinitely during operation of the solid oxide fuel cell system 110. In further embodiments, the efficiency of the solid oxide fuel cell system 110 exceeds 60% and is maintained in excess of 60% indefinitely during operation of the solid oxide fuel cell system 110. In yet even further embodiments, the efficiency of the solid oxide fuel cell system 110 exceeds 80% and is maintained in excess of 80% indefinitely during operation of the solid oxide fuel cell system 110.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of removing carbonaceous deposits in a liquid-hydrocarbon fueled solid oxide fuel cell, the method comprising:

providing a solid oxide fuel cell system comprising an anode, a cathode, a solid oxide electrolyte oriented between the anode and cathode, an amplifier cathode disposed proximate the solid oxide electrolyte and the cathode, a fuel cell electric circuit electrically connecting the anode and the cathode, and an amplifier electric circuit electrically connecting the anode and the amplifier cathode, wherein the amplifier electric circuit comprises at least one battery, potentiostat, or galvanostat that powers and controls the amplifier electric circuit;

operating the amplifier electric circuit in an electrolytic mode to electrically power the amplifier cathode, wherein the amplifier cathode generates and supplies $O^{2-}$ or $CO_3^{2-}$ to the anode; and removing the carbonaceous deposits on the anode by converting the carbonaceous deposits to carbon dioxide gas via reaction with the $O^{2-}$ or $CO_3^{2-}$ and expelling the carbon dioxide gas.

2. The method of claim 1, wherein the current supplied to the amplifier electric circuit is substantially constant over time.

3. The method of claim 2, wherein the current supplied to the amplifier electric circuit maintains a voltage above the $O_2$ reduction potential and below the electrolyte reduction potential.

4. The method of claim 1, wherein the current supplied to the amplifier electrode circuit is pulsed.

5. The method of claim 4, wherein the solid oxide fuel cell system further comprises a control circuit to pulse the current supplied to the amplifier electrode circuit such that current is supplied when the power output of the solid oxide fuel cell system drops below 50% of initial operation without carbonaceous deposits.

6. The method of claim 1, wherein the cathode and the amplifier cathode are different compositions.

7. The method of claim 1, wherein the cathode, the amplifier cathode, or both is selected from the group consisting of at least one perovskite material of the general type $ABO_3$ or $ABMO_3$ or $A_{1-x}Sr_xFe_{1-y}Co_yO_{3-\delta}$ or $A_{1-x}B_xM_{1-y}Mg_yO_{3-\delta}$, wherein:

A is La, Sn, Nd, Gd, Ba or Dy,
B is a $2^+$, $3^+$, $4^+$ or $5^+$ cation, and
M is a transition metal.

8. The method of claim 7, wherein the perovskite material is $LaSrFeCoO_{3-\delta}$ (LSCF), or $LaSrMnO_{3-\delta}$ (LSM), or $Sr_2MgMo_{0.8}Nb_{0.2}O_{6-\delta}$.

9. The method of claim 1, wherein the anode comprises a metallic, metal oxide, or ceramic-metallic.

10. The method of claim 9, wherein the anode comprises metal selected from the group consisting of iron (Fe), copper (Cu), nickel (Ni), cobalt (Co), molybdenum (Mo), gold (Au), ruthenium (Ru), rhodium (Rh), tungsten (W), chromium (Cr), terbium (Tb), magnesium (Mg), platinum (Pt), palladium (Pd), and combinations thereof.

11. The method of claim 1, wherein the electrolyte is zirconia-based, ceria-based, titania-based, a perovskite oxide, or cationic carbonate-based.

12. The method of claim 1, wherein the solid oxide fuel cell system further comprises a liquid fuel atomizer located to distribute the liquid-hydrocarbon fuel across the anode.

13. A method of removing carbonaceous deposits in a liquid-hydrocarbon fueled solid oxide fuel cell, the method comprising:

providing a solid oxide fuel cell system comprising an anode, a cathode, a solid oxide electrolyte oriented between the anode and cathode, an amplifier cathode disposed proximate the solid oxide electrolyte and the cathode, a fuel cell electric circuit electrically connecting the anode and the cathode, and an amplifier electric circuit comprising at least one battery, potentiostat, or galvanostat electrically connecting the anode and the amplifier cathode;

monitoring a power reaction speed of the solid oxide fuel cell system;

operating the amplifier electric circuit in an electrolytic mode to electrically power the amplifier cathode, wherein the amplifier cathode generates and supplies $O^{2-}$ or $CO_3^{2-}$ to the anode;

removing the carbonaceous deposits on the anode by converting the carbonaceous deposits to carbon dioxide gas via reaction with the $O^{2-}$ or $CO_3^{2-}$ and expelling the carbon dioxide gas; and adjusting the current supplied to the amplifier electric circuit to obtain steady-state operation of the removal of the carbonaceous deposits on the anode.

14. The method of claim 13, wherein the current supplied to the amplifier electric circuit is substantially constant over time.

15. The method of claim 13, wherein the current supplied to the amplifier electrode circuit is pulsed.

16. The method of claim 13, wherein the amplifier electric circuit further comprises at least one potentiostat that powers and controls the amplifier electric circuit.

17. The method of claim 13, wherein the amplifier electric circuit further comprises at least one galvanostat that powers and controls the amplifier electric circuit.

18. The method of claim 11, wherein the zirconia-based electrolytes are selected from the group consisting of yttria stabilized $ZrO_2$ (YSZ), scandia stabilized $ZrO_2$ (ScSZ), calcia stabilized $ZrO_2$ (CSZ), samaria stabilized $ZrO_2$ (SmSZ), and combinations thereof.

19. The method of claim 11, wherein the ceria-based electrolytes are selected from the group consisting of gadolinium doped ceria (GDC), yttria doped ceria (YDC), samarium doped ceria (SmDC), scandium doped ceria (GDC), zirconium doped ceria (ZDC), gadolinia stabilized ceria (CGO) and combinations thereof.

* * * * *